United States Patent [19]

Kiczek

[11] Patent Number: 5,255,647
[45] Date of Patent: Oct. 26, 1993

[54] ELASTOMERIC GROMMENT-FASTENER ASSEMBLY

[75] Inventor: Casimir R. Kiczek, Novi, Mich.

[73] Assignee: Freudenberg-NOK General Partnership, Plymouth, Mich.

[21] Appl. No.: 14,729

[22] Filed: Feb. 8, 1993

[51] Int. Cl.[5] .................................................. F02F 7/00
[52] U.S. Cl. .................................. 123/195 C; 411/533
[58] Field of Search ...................... 123/195 C; 411/107, 411/352, 353, 369, 370, 533, 970, 999

[56] References Cited

U.S. PATENT DOCUMENTS

| | | |
|---|---|---|
| 4,492,189 | 1/1985 | Ogawa et al. ............... 123/195 C |
| 4,522,165 | 6/1985 | Ogawa ........................ 123/195 C |
| 4,732,519 | 3/1988 | Wagner ........................... 411/533 |

Primary Examiner—Noah P. Kamen
Attorney, Agent, or Firm—Dinnin & Dunn

[57] ABSTRACT

A new elastomeric grommet-fastener assembly for use in connection with first and second apertured workpieces, for example in connecting a valve cover to an automotive engine block, with the fastener assembly being comprised of a fastener with clamping surface thereunder, a shank, and a reduced diameter entry portion; a washer member including a radial flange portion and an axially extending washer sleeve, with the washer means being telescopically positioned on the fastener shank; and an elastomeric grommet means, being molded from an elastomer, and having an axially extending sleeve portion, and a radial rim portion extending laterally from an upper part of the sleeve portion, with said grommet being telescopically positioned over the washer; and the sleeve of said washer having at least one or more holes therethrough such that the molded grommet has a portion of its elastomer protruding through to the inside of the washer sleeve, thereby enabling the washer with its associated grommet member to be captured and held on the fastener shank while still permitting slight relative longitudinal movement between the fastener shank and the grommet-washer members; and, a new technique for securing the valve cover of an automotive engine in position which serves to substantially reduce or eliminate structural noise and vibrations associated with the valve cover securement.

13 Claims, 2 Drawing Sheets

ELASTOMERIC GROMMENT-FASTENER ASSEMBLY

BACKGROUND OF THE INVENTION

This invention broadly relates to a new fastener assembly for use in connection with at least first and second apertured workpieces. More particularly this invention relates to an elastomeric grommet-fastener assembly which may be used in fastening the valve cover of an automotive engine into its secured position on the engine head.

Automotive power train designers have had significant problems over the last 5-10 years or longer in reducing engine structural noise, vibration and harshness related to various moving or vibrating components of the under-the-hood engine assembly. For example, past valve cover arrangements for automotive engines have used various types of metal fastener arrangements to hold the valve cover in position on the engine, however, the past fastening means for securing the valve cover have transmitted significant structural noises, vibrations and the like, which it would be desirable to greatly reduce or eliminate altogether. Special fasteners have been used and attempted for this type fastening arrangement in the past but have not been successful.

As one example of the above, a prior art fastener arrangement is shown in U.S. Pat. No. 4,732,519 exemplifying a fastener assembly which has been employed in the past to secure a valve cover on an automotive engine. U.S. Pat. No. 4,732,519 employs wings 28 and 30 which are forged into the fastener shank 22 and a metal sleeve annular bead portion 33 that is smaller than the diameter of a circle defined by the wings 28 and 30 located on the fastener shank 22. The fastener assembly shown in U.S. Pat. No. 4,732,519 has been attempted for usage in the automotive industry since approximately 1986, however, there have been significant problems connected with its usage and application. For example that fastener assembly is cumbersome and difficult to work with because it requires manual assembly of expensive components, and in addition that fastener is difficult and expensive to build because it requires a specialized metal forging operation to make the metal sleeve which contains the wings 28 and 30 on the shank 22, as well as requiring the forming of an annular metal bead portion 33 on its washer member. Accordingly, there has been a long felt need in the art for an economical and efficient fastener assembly which can be suitably used in the securing of valve covers on an automotive engine; and which will also assist in substantially reducing structural noise, vibration, and harshness normally associated with the automotive engine.

The state of the art is indicated by the following cited references: Weidner U.S. Pat. No. Re. 27,085; Hirsch U.S. Pat. No. 765,139; Weber U.S. Pat. No. 793,754; Wehmanen U.S. Pat. No. 2,643,904; Armour U.S. Pat. No. 3,066,568; Scholz U.S. Pat. No. 4,176,437; King U.S. Pat. No. 4,521,147; Wagner U.S. Pat. No. 4,732,519; and Wagner U.S. Pat. No. 4,975,008.

A principal object of the invention is to provide a new and improved elastomeric grommet-fastener assembly for use in connection with at least first and second apertured workpieces.

Another object of the invention is to provide a new fastener assembly for use in securing the valve cover of an automotive engine in proper position while at the same time acting to substantially reduce and/or eliminate the transmission of engine structural noises and vibration.

Another object of the invention is to provide a new and improved valve cover assembly for an internal combustion engine which includes a special elastomeric grommet-fastener assembly technique.

Other objects, features and advantages of the present invention will become apparent from the subsequent description and the appended claims taken in conjunction with the accompanying drawings.

SUMMARY OF THE INVENTION

Briefly stated this invention comprises an elastomeric grommet-fastener assembly for use in connection with at least first and second apertured workpieces, said assembly comprising: a fastener, a washer means, and an elastomeric grommet means, said fastener having a head with a clamping surface thereunder, a shank, and a reduced diameter entry portion; said washer means including a radial flange portion and an axially extending washer sleeve, said washer means being telescopically associated with said fastener; said elastomeric grommet means being molded from an elastomer, and having an axially extending sleeve portion and a radial rim portion extending laterally from an upper portion of said sleeve portion, said grommet means being telescopically positioned over said washer means; and the sleeve of said washer means having at least one or more holes therethrough such that the molded grommet means has a portion of its elastomer protruding through to the inside of said washer sleeve, thereby enabling the washer means and grommet means to be economically and efficiently held in proper position on the fastener prior to and during usage of said fastener assembly.

From another aspect, briefly stated, the present invention comprises a new valve cover assembly for use in connection with an automotive engine, and which includes an elastomeric grommet-fastener assembly for use in connecting a valve cover element with at least a first aperture therein to the engine with at least a second aperture therein, said fastener assembly comprising: a fastener, a washer means, and an elastomeric grommet means, said fastener having a head with a clamping surface thereunder, a shank, and a reduced diameter entry portion, said washer means including a radial flange portion and an axially extending washer sleeve, said washer means being telescopically associated with said fastener, said elastomeric grommet means being molded from an elastomer, and having an axially extending sleeve portion, and a radial rim portion extending laterally from an upper part of said sleeve portion, said grommet means being telescopically positioned over said washer means, and the sleeve of said washer means having at least one or more holes therethrough such that the molded grommet means has a portion of its elastomer protruding through to the inside of said washer sleeve, thereby enabling the washer means and grommet means to be economically and efficiently held in proper position on the fastener prior to and during usage of said fastener assembly.

DESCRIPTION OF PREFERRED EMBODIMENTS

Figure 1:
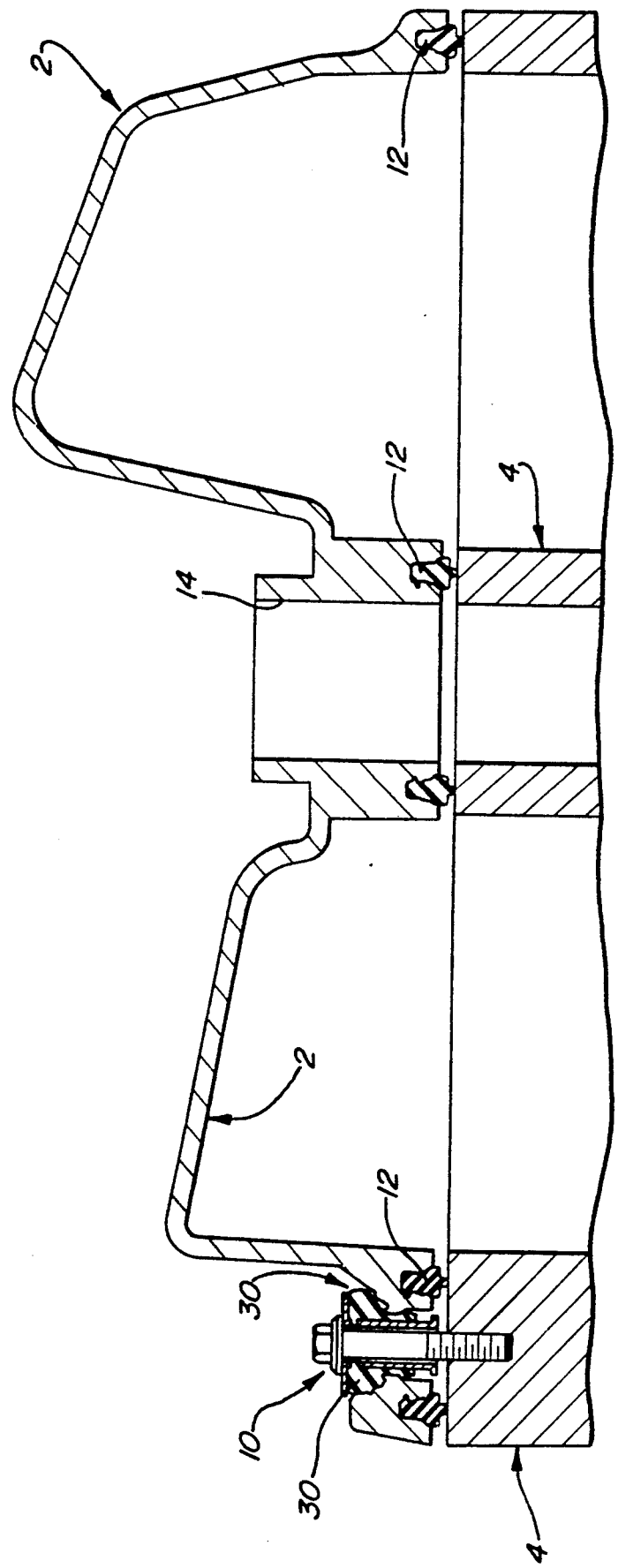
FIG. 1 is a cross-sectional view of the valve cover, gasket arrangement, and fastener assembly technique, relating to securing said valve cover to a typical automotive engine head, in accordance with the invention herein.

With reference to the drawings, wherein like numerals describe like elements, there is illustrated in FIG. 1 a representative assembly of a valve (or cam) cover 2 mounted to an engine head 4 through the fastener assembly generally designated 10. The valve cover 2 may suitably be sealed relative to the engine block 4 through usage of elastomeric gasket members designated 12. The central hole 14 is designed for threaded insertion and mounting of a spark plug (not shown), although numerous other valve cover shapes could be used wherein the spark plug hole may be in a different location. When the term valve cover is used herein it is meant to include either a valve cover or a cam cover.

Figure 2:
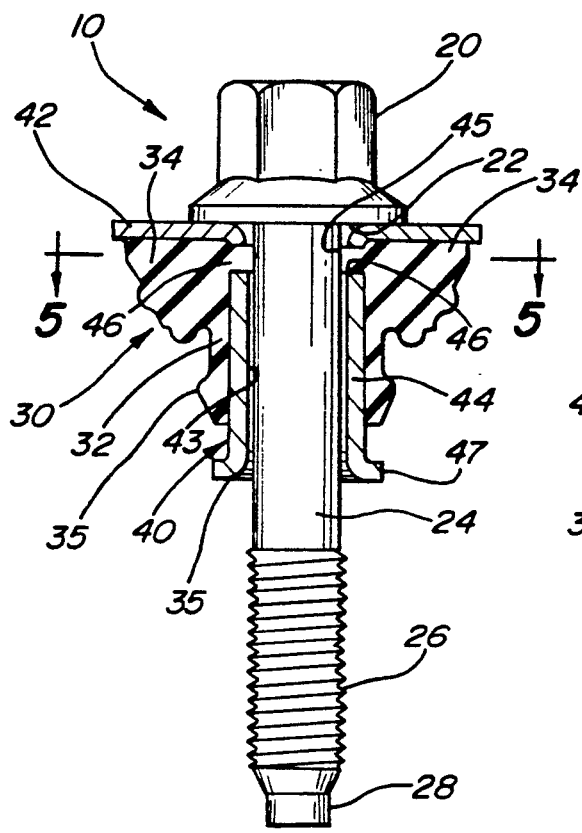
FIG. 2 is a view depicting one embodiment of the fastener assembly of the invention.
Figure 3:
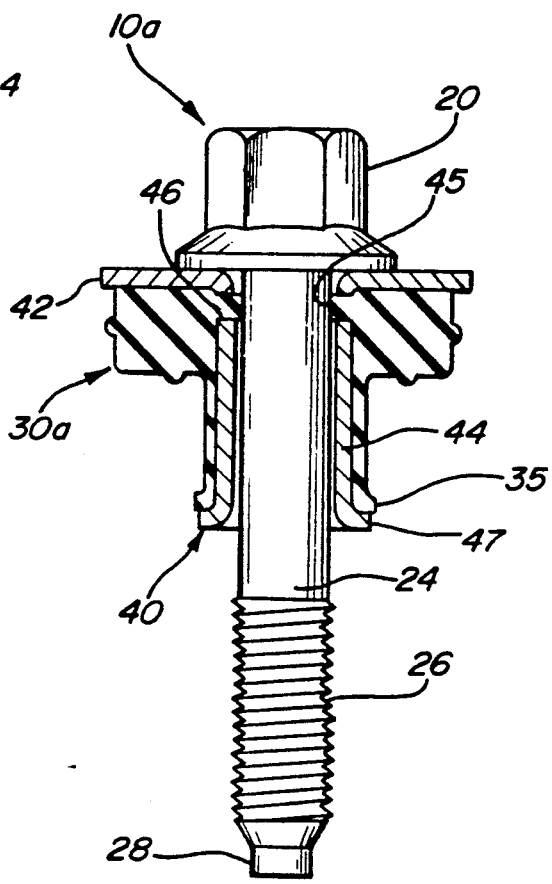
FIG. 3 is a view depicting another embodiment of the fastener assembly of the invention.
Figure 4:
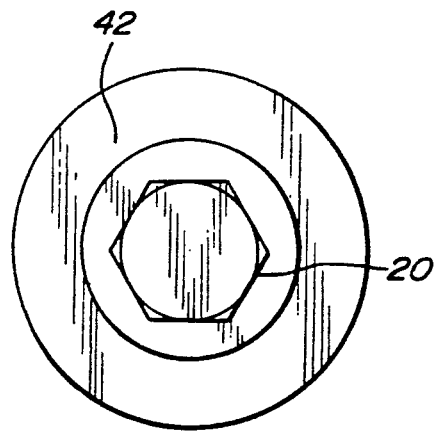
FIG. 4 is a top view of the fastener assemblies shown in either FIG. 2 or FIG. 3.
Figure 5:
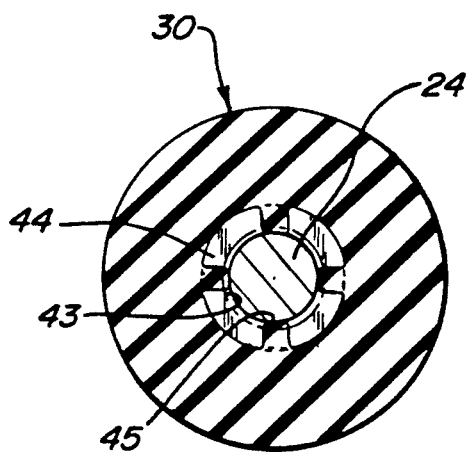
FIG. 5 is a cross-section view taken along line 5—5 in FIG. 2.

The fastener assembly 10 is more clearly shown in the enlarged view of FIG. 2, wherein the fastener assembly 10 is comprised of fastener head 20, with a clamping surface 22 thereunder, and a shank 24, which includes threaded portion 26 and a reduced diameter entry portion 28. The fastener assembly 10 also includes an elastomeric grommet 30 and a washer element designated 40.

The washer 40 includes radial flange portion 42, an axially extending sleeve portion 44, and a radial lip 47; and as can be seen from the drawing the washer is telescopically associated with the fastener shank 24. As can also be seen from the drawings, the sleeve 44 includes one or more apertures or holes 46 therethrough, for a purpose to be described below.

The grommet 30 is molded from a suitable elastomer such as rubber, or resilient thermoplastic elastomer, or the like. The grommet 30 includes an axially extending sleeve designated 32, and a radial rim designated 34 which extends laterally from an upper part of the sleeve portion of the grommet 30 and a curved rim 35 near the bottom thereof. The grommet, as seen from the drawings, is telescopically positioned over the washer 40.

The elastomeric grommet is molded to a shape such that it will telescopically fit (in press fitted relationship) over the sleeve 44; and the washer sleeve 44 is modified to permit the elastomeric material of the grommet 30 to bleed elastomeric or rubber flash into the inside diameter 43 of the sleeve 44. The elastomer or rubber flash, which bleeds or flows through one or more apertures 46, forms a reduced diameter portion designated 45 which protrudes through to the inside of the washer sleeve 44, thereby enabling the combined grommet 30 and washer 40 to be captured on the fastener shank 24, while still permitting slight relative longitudinal movement between the washer 40 and the fastener shank 24, but not permitting the combined grommet-washer members to slide past the threaded portion 26 of the fastener. In other words, the portion of the elastomer protruding through to the inside of the washer sleeve results in an effective inside diameter (at the point 45) which is slightly smaller than the major diameter of the threads 26 on the fastener, to thereby prevent the washer from sliding past the threads.

As a part of the invention and discovery herein it has been found that particularly good results are obtained when the durometer hardness (Shore A durometer) for the elastomeric grommet is within the broad range of 35 to about 85 and preferably within the range of about 40 to about 80. The elastomeric grommet should preferably be made from an organic and/or inorganic elastomeric material. The valve cover itself should preferably be made from either metals, such as aluminum or magnesium, or a thermoset material such as a polyester plastic or a vinyl ester plastic moldable material, and/or from a thermoplastic material such as a nylon plastic moldable material.

The gasket member 12, as referred to above in this invention, should be made from a resilient elastomeric-like material, and should possess a resilience or durometer hardness within the broad range of about 35 to about 75, and preferably about 40 to about 70 (as measured by Shore A durometer).

Technical Advantages Of The Invention: As will be seen from the description and drawings referred to above, the grommet, metal washer, and fastener referred to in the above description are easy and economical to manufacture; and function extremely well for carrying out the purposes and objects of the invention. In addition the fastener assembly described in this invention is considerably more economical and efficient to manufacture because it does not require the cumbersome and expensive steps of forging additional metallic elements on the fastener shank, and it also avoids the additional manufacturing requirement of forming or foring added interior elements on the inside diameter of the metal washer sleeve. Thus the fastener assembly described herein performs extremely well and provides a solution to the problems described hereinabove, while at the same time being considerably less expensive to manufacture. In addition, another unique feature of the invention involves what will be termed the mounting pressure or mounting firmness of the valve cover relative to the engine head. The valve cover 2 is mounted between the gasket 12 and the grommet (to provide for noise isolation and noise reduction). The Shore A durometers referred to above and the design features of the invention are such that there will be between about 5% and about 25% compression on both the grommet and the gasket. The sleeve 44 on the bolt 24 (in connection with the Shore A durometers) is designed to limit compression of the rubber grommet 30 within that percentage range, and thus the overall system provides both excellent noise reduction as well as excellent sealing of the valve cover.

While it will be apparent that the preferred embodiments of the invention disclosed are well calculated to fulfill the objects, benefits and advantages of the invention, it will be appreciated that the invention is susceptible to modification, variation and change without departing from the proper scope of fair meaning of the subjoined claims.

What is claimed is:

1. In a valve cover assembly for an automotive engine, an elastomeric grommet-fastener assembly for use in connecting a valve cover with at least a first aperture therein to the engine with at least a second aperture therein, said fastener assembly comprising: a fastener, a washer means, and an elastomeric grommet means, said fastener having a head with a clamping surface thereunder, a shank, and a reduced diameter entry portion, said washer means including a radial flange portion and an axially extending washer sleeve, said washer means being telescopically associated with said fastener, said elastomeric grommet means being molded from an elastomer, and having an axially extending sleeve portion, and a radial rim portion extending laterally from an upper portion of said sleeve portion, said grommet means being telescopically positioned over said washer means, and the sleeve of said washer means having at least one or more holes therethrough such that the molded grommet means has a portion of its elastomer protruding through to the inside of said washer sleeve, thereby enabling the washer means and grommet means to be economically and efficiently held in proper position on the fastener prior to and during usage of said fastener assembly.

2. The invention of claim 1 wherein, said portion of the elastomer protruding through to the inside of said washer sleeve also enables said washer means to be captured on the fastener while still permitting slight relative longitudinal movement between the fastener and the washer means prior to installing the fastener means.

3. The invention of claim 2 wherein, said portion of the elastomer protruding through to the inside of said washer sleeve results in an effective inside diameter for the washer sleeve which is slightly smaller than the major diameter of threads on the fastener to thereby prevent the washer means from sliding past the threads.

4. The invention of claim 1 wherein, said portion of the elastomer protruding through to the inside of said washer sleeve results in an effective inside diameter for the washer sleeve which is slightly smaller than the major diameter of threads on the fastener to thereby prevent the washer means from sliding past the threads.

5. The invention of claim 1 wherein, said grommet means is molded of rubber.

6. The invention of claim 1 wherein, said elastomeric grommet means has a Shore A durometer between about 35 and about 85, and said valve cover element is made of a molded plastic selected from at least one material from the group consisting of a polyester, a vinyl ester, or a nylon plastic material.

7. The invention of claim 6 wherein, said valve cover has a peripheral gasket which acts to seal the valve cover relative to the engine, and said gasket possesses a Shore A durometer between about 35 and about 75, and further characterized in that both the grommet means and the gasket are subject to about 5% to about 25% compression when the valve cover is installed on the engine.

8. An elastomeric grommet-fastener assembly for use in connection with at least first and second apertured workpieces, said assembly comprising: a fastener, a washer means, and an elastomeric grommet means, said fastener having a head with a clamping surface thereunder, a shank, and a reduced diameter entry portion, said washer means including a radial flange portion and an axially extending washer sleeve, said washer means being telescopically associated with said fastener, said elastomeric grommet means being molded from an elastomer, and having an axially extending sleeve portion, and a radial rim portion extending laterally from an upper part of said sleeve portion, said grommet means being telescopically positioned over said washer means, and the sleeve of said washer means having at least one or more holes therethrough such that the molded grommet means has a portion of its elastomer protruding through to the inside of said washer sleeve, thereby enabling the washer means and grommet means to be economically and efficiently held in proper position on the fastener prior to and during usage of said fastener assembly.

9. The invention of claim 8 wherein, said portion of the elastomer protruding through to the inside of said washer sleeve also enables said washer means to be captured on the fastener while still permitting slight relative longitudinal movement between the fastener and the washer means prior to installing the fastener means.

10. The invention of claim 9 wherein, said portion of the elastomer protruding through to the inside of said washer sleeve results in an effective inside diameter for the washer sleeve which is slightly smaller than the major diameter of threads on the fastener to thereby prevent the washer means from sliding past the threads.

11. The invention of claim 8 wherein, said portion of the elastomer protruding through to the inside of said washer sleeve results in an effective inside diameter for the washer sleeve which is slightly smaller than the major diameter of threads on the fastener to thereby prevent the washer means from sliding past the threads.

12. The invention of claim 11 wherein, said elastomeric grommet means has a Shore A durometer between about 35 and about 85.

13. The invention of claim 8 wherein, said grommet means is molded of rubber and said washer means is made of metal.

* * * * *